US009016465B2

(12) United States Patent
Kuesel

(10) Patent No.: US 9,016,465 B2

(45) Date of Patent: Apr. 28, 2015

(54) CONVEYOR BELT ARRANGEMENT INCLUDING A CONVEYOR BELT HAVING A HYBRID CONDUCTOR LOOP

(71) Applicant: Phoenix Conveyor Belt Systems GmbH, Bad Blankenburg (DE)

(72) Inventor: Bernd Kuesel, Hamburg (DE)

(73) Assignee: Phoenix Conveyor Belt Systems GmbH, Bad Blankenburg (DE)

( * ) Notice: Subject to any disclaimer, the term of this patent is extended or adjusted under 35 U.S.C. 154(b) by 0 days.

(21) Appl. No.: 14/148,131

(22) Filed: Jan. 6, 2014

(65) Prior Publication Data

US 2014/0116858 A1 May 1, 2014

Related U.S. Application Data

(63) Continuation of application No. PCT/EP2012/060793, filed on Jun. 7, 2012.

(30) Foreign Application Priority Data

Jul. 11, 2011 (DE) ........................ 10 2011 051 722

(51) Int. Cl.
*B65G 43/00* (2006.01)
*B65G 15/36* (2006.01)
(Continued)

(52) U.S. Cl.
CPC ................ *B65G 15/36* (2013.01); *B65G 15/00* (2013.01); *B65G 43/02* (2013.01)

(58) Field of Classification Search
CPC .......................... B65G 43/02; B65G 2203/042
USPC ................... 198/847, 810.03, 810.02, 810.04
See application file for complete search history.

(56) References Cited

U.S. PATENT DOCUMENTS 3,731,113 A * 5/1973 Lowe et al. .............. 198/810.02
4,621,727 A 11/1986 Strader (Continued)

FOREIGN PATENT DOCUMENTS

DE 1 556 723 A1 8/1970
DE 40 14 475 A1 10/1990

(Continued)

OTHER PUBLICATIONS

International Search Report dated Sep. 3, 2012 of international application PCT/EP2012/060793 on which this application is based.

*Primary Examiner* — James R Bidwell
(74) *Attorney, Agent, or Firm* — Walter Ottesen P.A.

(57) ABSTRACT

A conveyor belt has a carrying side cover plate and a running side cover plate each of a polymer material having elastic properties. The conveyor belt defines a conveyor belt longitudinal direction (X) and has an embedded reinforcement and at least one of the cover plates is provided with a hybrid conductor loop. The hybrid conductor loop communicates in a contactless manner with an interrogation station in the form of a transmitter/receiver pair. The hybrid conductor loop has a flattened conductor cross section and runs in the conveyor belt obliquely at an angle ($\alpha$) relative to the conveyor belt transverse direction (Y) to form a diagonal direction (Z). The transverse direction (Y) is at right angles to the longitudinal direction (X). The arrangement of the transmitter/receiver pair is adapted to the diagonal direction (Z) to so increase the mutual spacing of the transmitter and the receiver.

13 Claims, 2 Drawing Sheets

(51) Int. Cl.
*B65G 15/00* (2006.01)
*B65G 43/02* (2006.01)

(56) References Cited

U.S. PATENT DOCUMENTS

| | | | | |
|---|---|---|---|---|
| 4,854,446 | A * | 8/1989 | Strader | 198/810.02 |
| 5,168,266 | A * | 12/1992 | Fukuda | 198/810.02 |
| 6,352,149 | B1 * | 3/2002 | Gartland | 198/810.02 |
| 6,581,755 | B1 | 6/2003 | Wilke et al. | |
| 6,715,602 | B1 * | 4/2004 | Gartland | 198/810.02 |
| 7,178,663 | B2 | 2/2007 | Schnell | |
| 7,494,004 | B2 * | 2/2009 | Stolyar et al. | 198/810.02 |
| 2012/0012444 | A1 | 1/2012 | Kuesel | |

FOREIGN PATENT DOCUMENTS

| | | | |
|---|---|---|---|
| DE | 44 44 264 | C1 | 4/1996 |
| DE | 196 07 867 | A1 | 9/1997 |
| DE | 198 27 120 | A1 | 12/1999 |
| DE | 199 02 508 | A1 | 8/2000 |
| DE | 101 00 249 | A1 | 7/2001 |
| DE | 10 2009 043 904 | A1 | 3/2011 |
| GB | 1 246 786 | A | 9/1971 |
| WO | WO 2008/034483 | A1 | 3/2008 |

* cited by examiner

CONVEYOR BELT ARRANGEMENT INCLUDING A CONVEYOR BELT HAVING A HYBRID CONDUCTOR LOOP

CROSS REFERENCE TO RELATED APPLICATIONS

This application is a continuation application of international patent application PCT/EP2012/060793, filed Jun. 7, 2012, designating the United States and claiming priority from German application 10 2011 051 722.7, filed Jul. 11, 2011, and the entire content of both applications is incorporated herein by reference.

FIELD OF THE INVENTION

The invention relates to a conveyor belt arrangement having a conveyor belt. The conveyor belt has a cover plate on the carrying side and a cover plate on the running side, each made of a polymer material having elastic properties, and having an embedded reinforcement, wherein the cover plate on the carrying side and/or that on the running side is/are equipped with at least one hybrid conductor loop comprising a textile and corrosion-resistant metallic material. The hybrid conductor loop communicates contactlessly with an interrogation station in the form of a transmitter/receiver pair.

BACKGROUND OF THE INVENTION

The cover plate on the carrying side and that on the running side of a conveyor belt normally consist of a rubber mixture containing a rubber component or a rubber component blend, a wetting agent or a wetting system, comprising a wetting agent and an accelerator, and also normally further mixing ingredients, in particular a filler and/or a processing aid and/or an aging prevention aid and/or a plasticizer and/or other additives (for example, fibers, colored pigments). The relevant rubber basis is in particular:

natural rubber (NR)
butadiene rubber (BR)
chloroprene rubber (CR)
styrene-butadiene rubber (SBR)
nitrile rubber (NBR)
butyl rubber (IIR)
ethylene-propylene rubber (EPM)
ethylene-propylene-diene rubber (EPDM)
SBR/NR blend
SBR/BR blend
NR/BR blend.

Of particular importance hitherto has been CR, which is distinguished by high resistance to flames, weathering and aging, in particular for conveyor belts with use in underground mining. Furthermore, NR and the aforementioned blends (DE 10 2009 043 904 A1) have acquired greater importance in surface mining.

As a result of the vulcanization of a rubber mixture of the aforementioned type, the conveyor belt is imparted the required elastic properties.

The conveyor belt is provided with embedded tension members or reinforcement. The embedded tension members used in the longitudinal direction of the conveyor belt are cords made of steel or aramid, cords made of steel being of particular importance. However, the tension member can also be a single-layer or multi-layer textile structure, in particular in the form of a woven fabric. A polyamide-polyester fabric is of particular importance here. In particular in conjunction with steel cord conveyor belts, for the purpose of slit protection, an embedded transverse reinforcement which is embedded in the cover plate on the carrying side and/or on the running side and is made of synthetic cords, for example of polyamide, is additionally used (WO 2008/034483 A1).

At least one conductor loop is fully embedded in the cover plate on the carrying side and/or on the running side of the conveyor belt. The conductor loop is a continuous (short-circuited) loop. Normally, a plurality of conductor loops are embedded in a conveyor belt at a spacing of 50 to 200 m, in particular 50 to 100 m, to be specific as individual conductor loops or a packet of conductor loops.

With regard to conductor loop technology, reference is made in particular to the following patent literature:

DE 15 56 723 A1
DE 40 14 475 A1
DE 44 44 264 C1
DE 196 07 867 A1
DE 198 27 120 A1
U.S. Pat. No. 6,581,755
DE 101 00 249 A1
U.S. Pat. No. 4,621,727
U.S. Pat. No. 7,178,663
US 2012/0012444
AU 57 558 B
GB 1 246 786 A

Conveyor belt conductor loop technology will be explained in more detail below.

The conductor loop has the task of making the occurrence of longitudinal slits detectable. Here, the conductor loop is checked for intactness with the aid of an interrogation station in the form of a transmitter/receiver pair. If a longitudinal slit occurs in the conveyor belt, the conductor loop will also be destroyed and the transmitter/receiver transmission link will be interrupted. A criterion for stopping a conveyor belt at the start of the slitting process and limiting the length of the slit is therefore obtained. As a result, the maximum possible length of the slit is limited to the distance between two conductor loops plus the braking travel. Unfortunately, after relatively long use of the conveyor belts, false alarms, which are triggered by the fact that the conductor loop has been destroyed without a slit in the belt having occurred, occur more and more frequently.

The conductor loop frequently consists of meander-shaped built-in metal cords, in particular of steel cords. The cords in turn normally comprise at least five strands. Preference is given here to a cord structure of the 7×7 type with an individual wire diameter of about 0.2 mm and an overall diameter of 1.5 mm to 2 mm. There are also variants which comprise a mixed structure of copper strands and steel strands, wherein, in particular, the steel strands encase the copper strands. Also known is a version consisting of a solid copper wire encased in steel strands.

The meander-shaped structure (DE 196 07 867 A1, FIG. 1) is particularly suitable for increasing the extensibility of the conductor loop, since the latter would otherwise be destroyed after a relatively short time by the mechanical stress in the conveyor belt, namely bending and loading stress. The production of the meanders requires the use of a relatively ductile material but this has a detrimental effect on the service life of the conductor loop. Although materials with a higher elasticity improve the long-term strength of the individual cord considerably, they make it more difficult to form this meander. In addition, the use of so-called "high-elongation" cords (HE cords), which, as a result of their structure, are more extensible than the cords, improves the service life but likewise makes forming the meanders more difficult.

In DE 101 00 249 A1, a conductor loop is presented which has a higher cord mass within the edge region of the conveyor belt than in the middle region of the conveyor belt. The conductor belt here is also free of crossing points, specifically as opposed to the 8-shaped conductor loop, as described in U.S. Pat. No. 4,621,727. By using such a design, it is possible to achieve a higher electromagnetic sensitivity.

U.S. Pat. No. 7,178,663 discusses a more recent conductor loop development. Here, in order to provide a highly flexible and highly extensible conductor loop with an increased service life, it is proposed to form the conductor loop as an open stranded helix, each individual wire being encapsulated by a polymer material with elastic properties. As a result of this measure, in addition the internal friction between the wires is suppressed.

The disadvantages of conductor loops according to the prior art listed in more detail here, according to which the conductor loop cords normally consist of steel, are their susceptibility to corrosion, their low flexibility, despite the measures according to U.S. Pat. No. 7,178,663, their low extensibility and lastly the susceptible connection within the context of the spliced belt.

In United States patent application publication 2012/0012444, for the purpose of increasing the flexibility with simultaneous material resistance, a conductor loop is now presented which is formed from at least one hybrid filament. The hybrid filament, in turn, consists at least of a textile first material and a conductive second material.

The textile first material is preferably a polyamide (PA), aramid, polyester (PES), polyvinyl acetal (PVA), polyimide (PI), polyether ether ketone (PEEK) or a polyphenylene. From the group of polyphenylenes, a polyphenylene sulfide (PPS) is significant.

The conductive second material is in particular a corrosion-resistant metal. Of particular importance is a noble metal, in particular in the form of silver, in particular, in turn, as pure silver.

The textile first material normally forms the core and the conductive second material the sheath of the hybrid filament. The encapsulation is carried out by electroplating or electrochemically.

Mostly, at least two hybrid filaments form a composite filament, specifically in the form of a cord or thread. The composite filament here has a thickness of 0.5 mm to 2 mm.

With regard to the subject concerning the hybrid conductor loop, reference is additionally in particular further made to DE 15 56 723 A1 and GB 1 246 786 A which are incorporated herein by reference.

SUMMARY OF THE INVENTION

An object of the invention is to provide the hybrid conductor loop according to United States patent application publication 2012/0012444 in such a way that the electrical resistance is reduced. Furthermore, for a high electrical resistance of the hybrid conductor loop and the associated higher sensitivity of the receiver that has to be set, no signal is to be received directly between transmitter and receiver outside the hybrid conductor loop.

This object is achieved in that the hybrid conductor loop has a flattened conductor cross section (feature group I) and in that, in relation to the conveyor belt transverse direction, the hybrid conductor loop runs obliquely at an angle in the direction of the conveyor belt longitudinal direction, specifically forming a diagonal direction of the hybrid conductor loop, wherein the arrangement of the transmitter/receiver pair is adapted to the diagonal direction, specifically increasing the distance between transmitter and receiver (feature group II).

With regard to the two feature groups I and II, the following should be noted:

Feature Group I

As compared with the conductor cross section according to the prior art, according to which the conductor has a substantially circular or round cross section, here the conductor cross section is flattened. In this way, there is more cover plate material over the hybrid conductor loop, that is, more "wear material". This measure is important in particular in the cover plate on the running side, since the cover plate thickness there is normally less than that of the cover plate on the carrying side. By using this measure, the electrical resistance of the hybrid conductor loop is reduced.

In conjunction with FIGS. 3 and 4, this embodiment concept will be explained in more detail, including an advantageous design variant.

Feature Group II

As a result of the diagonal incorporation of the hybrid conductor loop, the distance between transmitter and receiver is increased. This is necessary in order not to receive any signal directly between transmitter and receiver of the interrogation station outside the hybrid conductor loop, given a high electrical resistance of the hybrid conductor loop and the associated higher sensitivity of the receiver that has to be set.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
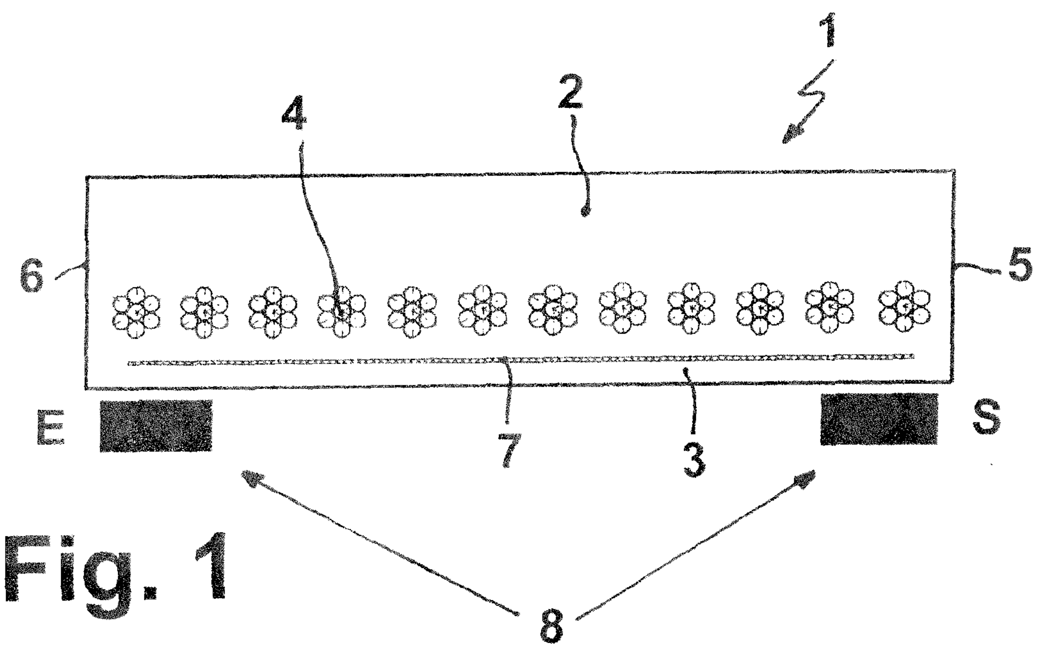
FIG. 1 is a schematic of a conveyor belt having a hybrid conductor loop.

FIG. 1 shows a conveyor belt 1 which comprises a cover plate 2 on the carrying side thereof and a cover plate 3 on the running side, each made of a polymer material with elastic properties. The polymer material is in particular a vulcanized rubber mixture, for example based on CR. Embedded in between these two cover plates is a reinforcement 4 in the form of steel cords.

A hybrid conductor loop 7 extends from conveyor belt edge 5 to conveyor belt edge 6 within the cover plate 3 on the running side; the diagonal course thereof will be explained in more detail with reference to FIG. 2.

The hybrid conductor loop 7 communicates contactlessly with an interrogation station 8 in the form of a transmitter S/receiver E pair. The arrangement concept of transmitter S and receiver E is a feature of this invention and reference is likewise made to the description of FIG. 2.

Figure 2:
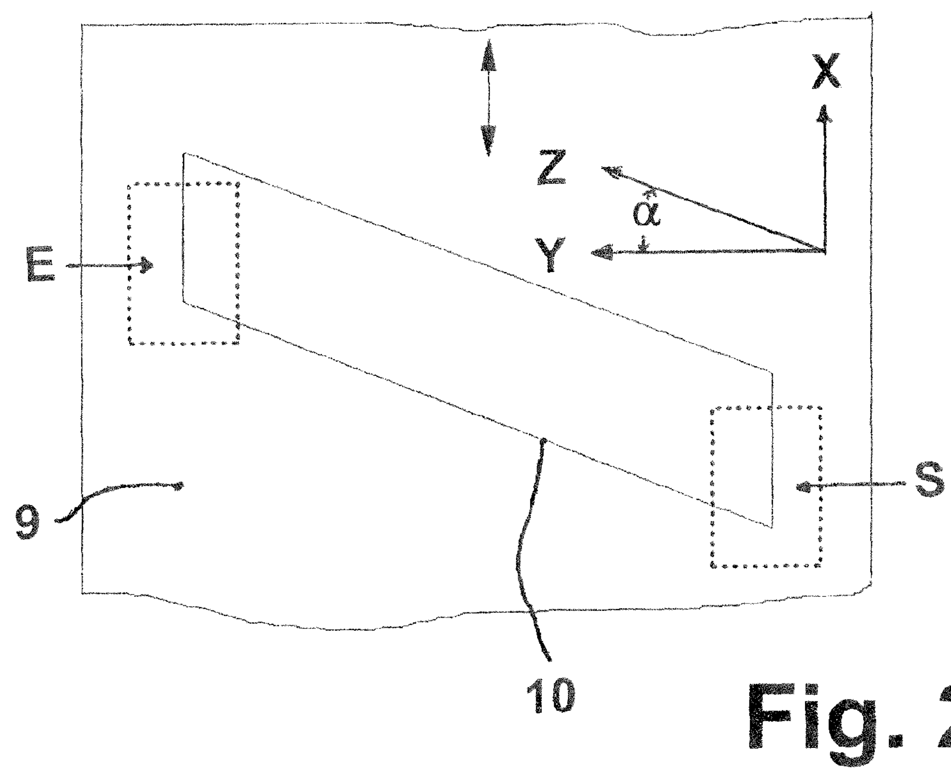
FIG. 2 shows a conveyor belt having a hybrid conductor loop in the diagonal direction.

FIG. 2 shows a conveyor belt 9 having an embedded hybrid conductor loop 10. Shown here is the conveyor belt transverse direction Y, which runs at right angles to the two conveyor belt edges, that is, at right angles to the conveyor belt longitudinal direction X. The diagonal direction Z is also shown. The angle (α) is between the conveyor belt transverse direction Y and the diagonal direction Z.

The hybrid conductor loop 10 now runs obliquely in relation to the conveyor belt transverse direction Y in the direction of the conveyor belt longitudinal direction X at an angle (α), specifically forming a diagonal direction Z. The angle (α) is preferably 10° to 45°, in particular 20° to 45°, in particular in turn 20° to 30°.

The arrangement of the transmitter S/receiver E pair likewise matches the diagonal direction Z, specifically by increasing the distance between transmitter S and receiver E.

Figure 3:
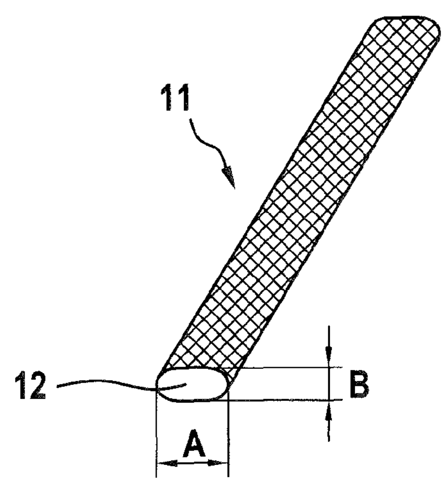
FIG. 3 shows the flattened conductor cross section of a hybrid conductor loop; and, FIG. 4 shows an advantageous configuration of the hybrid conductor loop.

FIG. 3 now shows a hybrid conductor loop 11 having a flattened conductor cross section 12, specifically as distinct from the embodiment according to United States patent application publication 2012/0012444 (FIG. 3). The width A of the conductor cross section is at least 1.5 times, in particular at least twice, the height B thereof.

Figure 4:
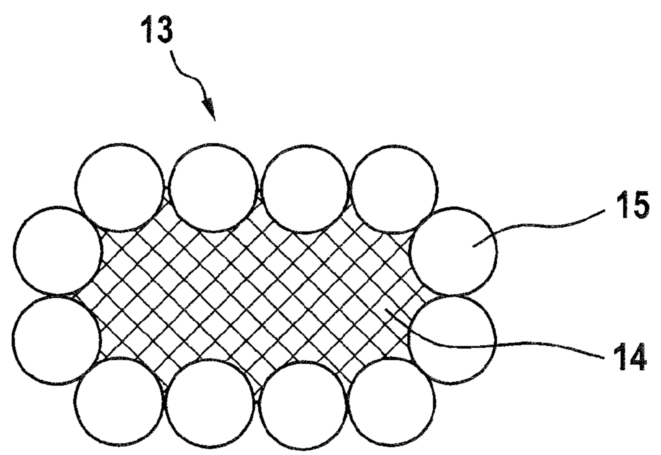

FIG. 4 likewise shows a hybrid conductor loop 13 having a flattened conductor cross section. This conductor loop has a conductor core 14 made of a textile material, for example of polyamide, and a conductor sheath made of a corrosion-resistant metallic material. The conductor sheath, which performs the electrical conductivity, is preferably present as wire braid, in particular based on a noble metal, in particular in turn based on silver.

With regard to further possible materials of a hybrid conductor loop, reference is made in particular to United States patent application publication 2012/0012444 incorporated herein by reference.

It is understood that the foregoing description is that of the preferred embodiments of the invention and that various changes and modifications may be made thereto without departing from the spirit and scope of the invention as defined in the appended claims.

LIST OF REFERENCE CHARACTERS

Part of the Description

1 Conveyor belt
2 Cover plate on the carrying side
3 Cover plate on the running side
4 Tension member or reinforcement
5 Conveyor belt edge
6 Conveyor belt edge
7 Hybrid conductor loop
8 Interrogation station in the form of a transmitter/receiver pair
9 Conveyor belt
10 Hybrid conductor loop
11 Hybrid conductor loop
12 Conductor cross section
13 Hybrid conductor loop
14 Conductor core
15 Conductor sheath
A Width of the conductor cross section
B Height of the conductor cross section
E Receiver
S Transmitter
X Conveyor belt longitudinal direction
Y Conveyor belt transverse direction
Z Diagonal direction of the hybrid conductor loop
α Angle between Y and Z

What is claimed is:

1. A conveyor belt arrangement comprising:

a conveyor belt defining a longitudinal direction (X) and having a carrying side cover plate and a running side cover plate defining an outer lower surface;

each of said cover plates being made of a polymer material having elastic properties;

said conveyor belt including a tension reinforcement embedded therein;

said conveyor belt further including at least one hybrid conductor loop disposed in said running side cover plate;

said hybrid conductor loop being configured to have a flattened conductor cross section and being embedded within said running side cover plate to lie between said tension reinforcement and said outer lower surface so as to reduce the electric resistance of said hybrid conductor loop;

an interrogation station including a transmitter and a receiver configured to contactlessly communicate with said hybrid conductor loop and said transmitter and said receiver being disposed at a distance from each other;

said hybrid conductor loop being further configured to extend in a diagonal direction (Z) at an angle (α) with respect to a transverse direction (Y) transverse to said longitudinal direction (X); and, said transmitter and said receiver being arranged so as to adapt to said diagonal direction (Z) of said hybrid conductor loop so as to cause said distance to be increased.

2. The conveyor belt arrangement of claim 1, wherein said hybrid conductor loop includes a conductor core made of textile material and a conductor jacket made of metallic material.

3. The conveyor belt arrangement of claim 2, wherein said conductor jacket is configured as a wire braid.

4. The conveyor belt arrangement of claim 2, wherein said conductor jacket is configured as a wire braid based on a noble metal.

5. A conveyor belt arrangement comprising:

a conveyor belt defining a longitudinal direction (X) and having a carrying side cover plate and a running side cover plate;

each of said cover plates being made of a polymer material having elastic properties;

said conveyor belt including a tension reinforcement embedded therein;

said conveyor belt further including at least one hybrid conductor loop disposed in at least one of said cover plate and said running side cover plate;

said hybrid conductor loop being configured to have a flattened conductor cross section;

an interrogation station including a transmitter and a receiver configured to contactlessly communicate with said hybrid conductor loop and said transmitter and said receiver being disposed at a distance from each other;

said hybrid conductor loop being further configured to extend in a diagonal direction (Z) at an angle (α) with respect to a transverse direction (Y) transverse to said longitudinal direction (X);

said transmitter and said receiver being arranged so as to adapt to said diagonal direction (Z) of said hybrid conductor loop so as to cause said distance to be increased; and, said conductor cross section having a width (A) and a height (B) and said width (A) being at least 1.5 times said height (B).

6. The conveyor belt arrangement of claim 5, wherein said width (A) is at least 2 times said height (B).

7. The conveyor belt arrangement of claim 5, wherein said angle (α) lies in a range of 10° to 45°.

8. The conveyor belt arrangement of claim 5, wherein said angle (α) lies in a range of 20° to 45°.

9. The conveyor belt arrangement of claim 8, wherein said angle (α) lies in a range of 20° to 30°.

10. A conveyor belt arrangement comprising:

a conveyor belt defining a longitudinal direction (X) and having a carrying side cover plate and a running side cover plate;

each of said cover plates being made of a polymer material having elastic properties;

said conveyor belt including a tension reinforcement embedded therein;

said conveyor belt further including at least one hybrid conductor loop disposed in at least one of said cover plate and said running side cover plate;

said hybrid conductor loop being configured to have a flattened conductor cross section;

an interrogation station including a transmitter and a receiver configured to contactlessly communicate with said hybrid conductor loop and said transmitter and said receiver being disposed at a distance from each other;

said hybrid conductor loop being further configured to extend in a diagonal direction (Z) at an angle (α) with respect to a transverse direction (Y) transverse to said longitudinal direction (X);

said transmitter and said receiver being arranged so as to adapt to said diagonal direction (Z) of said hybrid conductor loop so as to cause said distance to be increased; and, said hybrid conductor loop including a textile material and a corrosion-resistant metallic material.

11. The conveyor belt arrangement of claim 10, wherein said hybrid conductor loop includes a conductor core made of said textile material and a conductor jacket made of said metallic material.

12. The conveyor belt arrangement of claim 11, wherein said conductor jacket is configured as a wire braid.

13. The conveyor belt arrangement of claim 12, wherein said conductor jacket is configured as a wire braid based on a noble metal.

* * * * *